United States Patent [19]

McGonegle

[11] 4,039,200

[45] Aug. 2, 1977

[54] REAR WHEEL SUSPENSION SYSTEM FOR A MOTORCYCLE

[76] Inventor: James C. McGonegle, 6242 Crestview Place, Apt. No. 1, Cincinnati, Ohio 45230

[21] Appl. No.: 671,096

[22] Filed: Mar. 29, 1976

[51] Int. Cl.² ............................................. B62K 25/02
[52] U.S. Cl. ..................................... 280/284; 180/32; 180/33 C
[58] Field of Search .................. 180/32, 33 R, 33 B, 180/33 C; 280/284, 283

[56] References Cited

U.S. PATENT DOCUMENTS

| 2,596,391 | 5/1952 | Farinelli | 180/33 C |
| 3,754,612 | 8/1973 | Watanabe | 180/33 B |
| 3,817,342 | 6/1974 | Hamilton | 180/32 |
| 3,974,892 | 8/1976 | Bolger | 280/284 |

FOREIGN PATENT DOCUMENTS

| 461,366 | 1/1951 | Italy | 280/284 |
| 432,221 | 3/1953 | Italy | 280/284 |
| 290,170 | 4/1953 | Switzerland | 180/32 |

*Primary Examiner*—Joseph F. Peters, Jr.
*Assistant Examiner*—Terrance L. Siemens
*Attorney, Agent, or Firm*—Wood, Herron & Evans

[57] ABSTRACT

A suspension system for a motorcycle's rear wheel of the type in which that rear wheel is rotationally carried between two swing arms at one end of the swing arms, the moving arms being positioned on opposite sides of the rear wheel and being immobile relative to one another. The other end of the swing arms is pivotally mounted on a common axis to the motorcycle's main frame. Thus, the motorcycle's rear wheel is suspended from the main frame by the swing arms and the shock absorber. The unique feature of this invention is that the common pivot axis of the swing arms is located so as to pass through the tangent point of the tension run of the rear wheel's drive chain with that chain's power transfer sprocket when that chain is viewed from a line of sight perpendicular to the plane of that chain.

5 Claims, 4 Drawing Figures

U.S. Patent  Aug. 2, 1977  4,039,200
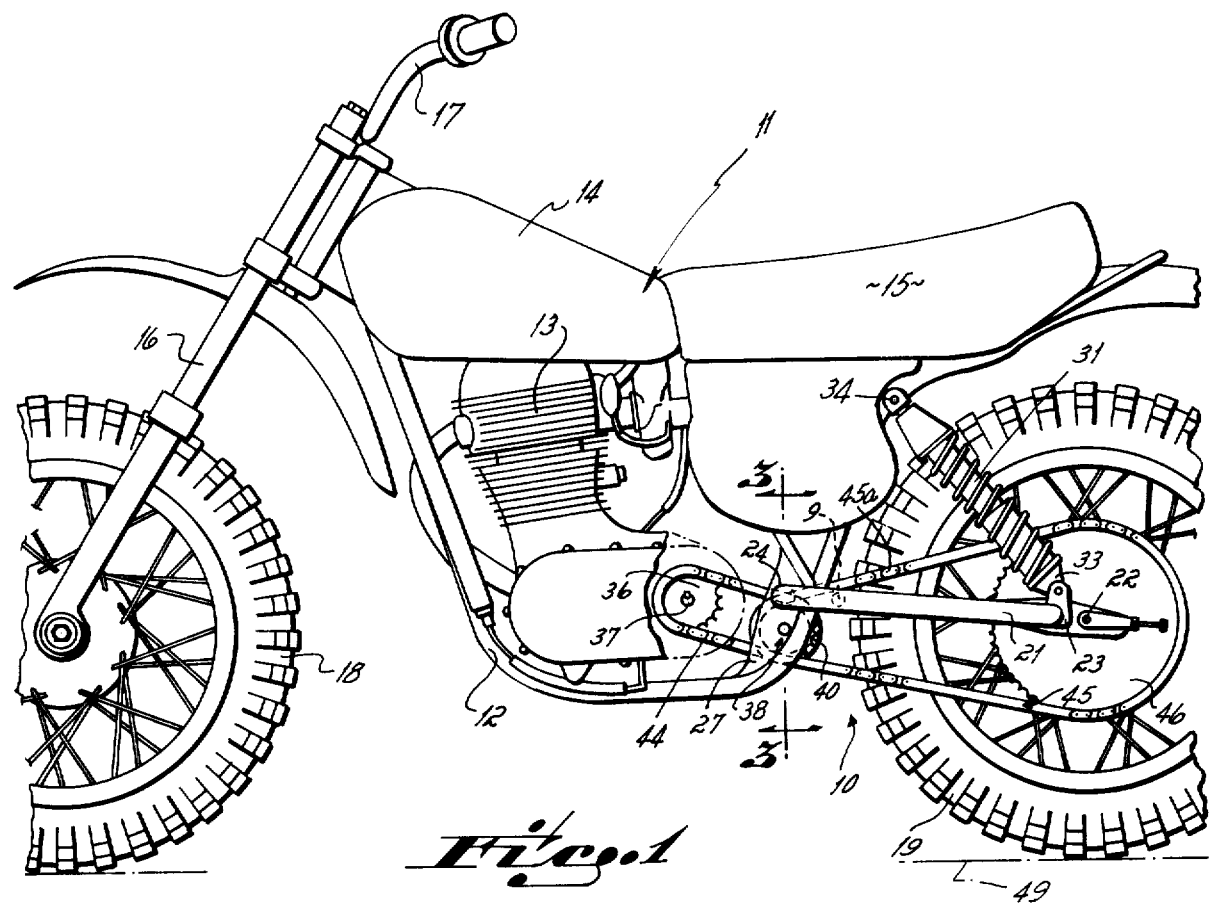
*Fig. 1*
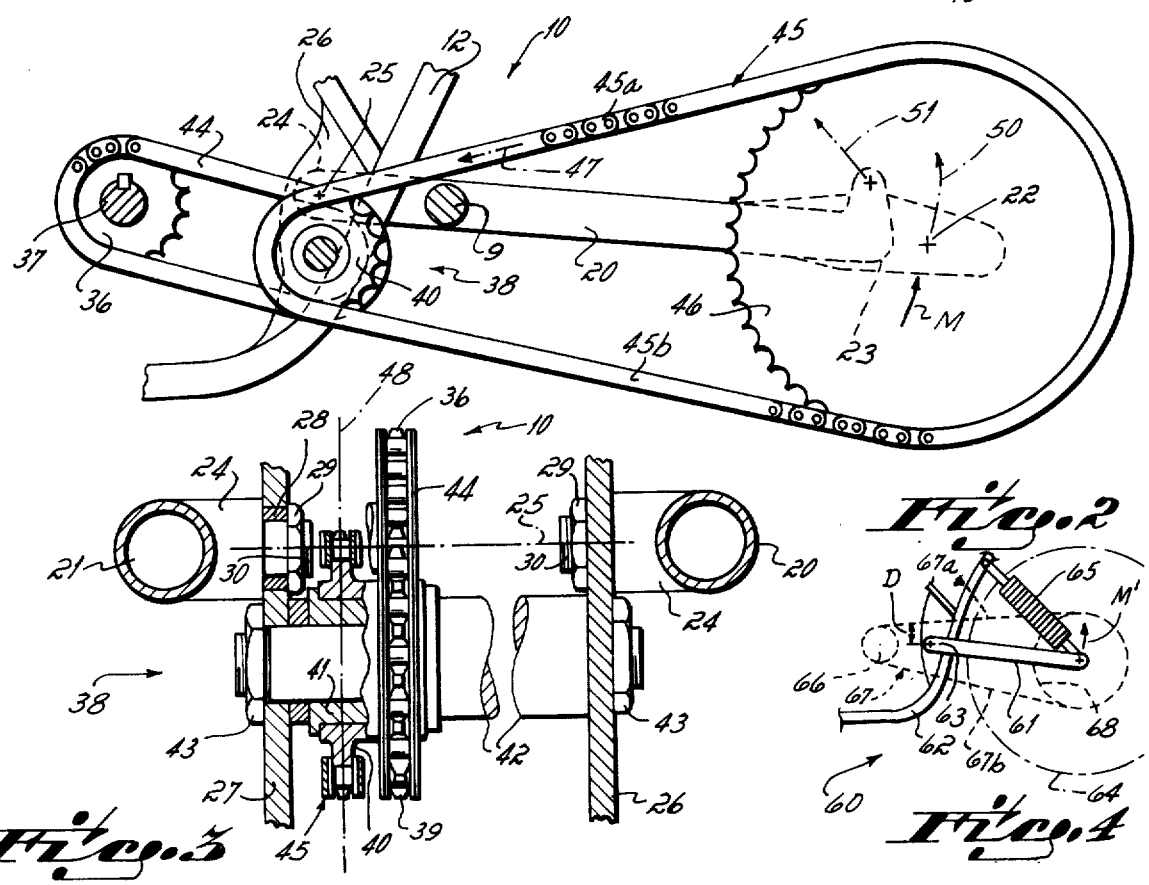
*Fig. 2*
*Fig. 3*
*Fig. 4*

REAR WHEEL SUSPENSION SYSTEM FOR A MOTORCYCLE

This invention relates to motorcycles. More particularly, this invention relates to a novel rear wheel suspension system for a motorcycle.

The rear wheel suspension system of a motorcycle is a very important functional part of the motorcycle from the rider's standpoint. In over-the-road motorcycles, the rear wheel suspension system's primary function is to provide a comfortable ride for the rider. However, in connection with trail motorcycles, i.e., those motorcycles particularly designed to run cross-country, the rear wheel suspension system also must provide the best possible traction for the rear wheel since the rear wheel is the drive wheel. Rear wheel traction becomes an acute problem when traveling cross-country over ground that is less than smooth such as, for example, irregular or bumpy terrain. This for the reason, of course, that the better the rear wheel traction is over a hole or bump, the better able the rider is to control the motorcycle through that type terrain and, indeed, the better able the rider is to make it through that terrain to the desired destination.

There are a number of different rear wheel suspension systems for trail motorcycles known to the prior art. All of those suspension systems basically include a generally horizontal swing arm on each side of the rear wheel, the swing arms being fixed or immobile relative to one another to establish an integral, or one-piece, swing arm frame. The motorcycle's rear wheel is rotationally carried between the parallel swing arms of that frame at one end, and the other end of those swing arms, i.e., of that frame, is pivotally connected on a common pivot axis to the motorcycles's main frame. At least one shock absorber is pivotally connected at one end adjacent the wheel end of the swing arms, and is pivotally connected at the other end to the motorcycle's main frame just underneath the rider's seat in symmetrical fashion on each side of the rear wheel. This symmetrical swing arm and shock absorber structure, on each side of the rear wheel, establishes a generally L-shaped suspension system when viewed from the motorcycle's side. In this L-shaped suspension system, the rear wheel is carried at the point of the L, and the swing arm and shock absorber, which constitute the legs of the L, are attached to the motorcycle's main frame at the tips of the L arms. A number of structural variations, also known to the prior art, are grounded on this basic or conventional type rear wheel suspension system.

One problem with the conventional or basic rear wheel suspension system described is that the motorcycle's rear wheel tends to lift off the ground, i.e., to compress the shock absorbers, and jump upward toward the rider's seat when rapid surges of power are supplied to the rear wheel by the rider. Such is occasioned by the swing arms being pivoted upward on their common pivot axis. The lifting or jumping of the rear wheel to an extent off the motorcycle's traction surface is particularly disruptive to the motorcycle's performance as same is passing over irregular or bumpy terrain. Of course, it is well known that the better the frictional contact between wheel and ground, the better the performance of the motorcycle. This performance is severely hindered, however, over bumpy or irregular terrain because traction between the wheel and ground is limited at the outset due to the nature of the terrain, and any further reduction in traction upon power surges delivered to the rear wheel even further limits the motorcycle's performance under such less-than-optimum traction conditions.

The pivoting of the rear wheel upward about the swing arms' common pivot axis, and against the opposing force provided by the shock absorbers, during surges of power to the rear wheel from the motorcycle's motor, is caused by the moment of force generated by the drive chain location vis-a-vis the common pivot axis of the swing arms. When the swing arms' common pivot axis is fixed to the motorcycle's frame intermediate the upper and lower runs of the drive chain (as is commonly the case in known rear wheel suspension structures of the type described above), a severe moment of force is developed about that common pivot axis when surges of power are delivered through the drive chain to the rear wheel. It is because of this moment of force that the rear wheel tends to kick up, or swing up, toward the rider's seat, and against the opposing force of the shock absorbers, in response to the surges of power.

It has been one objective of this invention to provide a novel rear wheel suspension system for a motorcycle, that suspension system being structured to severely reduce or dampen out the kicking or swinging up of the rear wheel toward the rider's seat upon delivery of power surges to the rear wheel through the drive chain.

It has been another objective of this invention to provide a novel rear wheel suspension system for a motorcycle, that suspension system being of the basic type in which the rear wheel is rotationally carried on a swing arm at one end with the swing arm being pivotally mounted on a pivot axis to the motorcycle's main frame at the other end, the suspension system being particularly characterized in that the pivot axis of the swing arm is located so as to pass through the tangent point of the tension run of the rear wheel's drive chain with that chain's power transfer sprocket when that chain is viewed from a line of sight perpendicular to the plane of that chain.

In accord with these objectives, the novel rear wheel suspension system for a motorcycle of this invention includes, in preferred form, a rear wheel rotationally carried between two swing arms at one end of the swing arms, the swing arms being positioned on opposite sides of the rear wheel and being immobile relative to one another. The other end of the swing arms is pivotally mounted on a common axis to the motorcycle's main frame. At least one shock absorber also connects the swing arms with the main frame. Thus, the motorcycle's rear wheel is suspended from the main frame by the swing arms and the shock absorbers. The unique feature of this invention is that, in preferred form, the common pivot axis of the swing arms is located so as to pass through the tangent point of the tension run of the rear wheel's drive chain with that chain's power transfer sprocket when that chain is viewed from a line of sight perpendicular to the plane of that chain.

Other objectives and advantages of this invention will be more apparent from the following detailed description taken in conjunction with the drawings in which:

FIG. 1 is a side view illustrating a motorcycle of the trail type, that motorcycle being provided with a novel rear wheel suspension system in accord with the principles of this invention;

FIG. 2 is an enlarged side view of the rear wheel suspension system illustrated in FIG. 1;

FIG. 3 is a cross-sectional view taken along line 3—3 of FIG. 1; and

FIG. 4 is an enlarged side view of a rear wheel suspension system in accord with the prior art.

As illustrated in FIG. 1, the novel rear wheel suspension system 10 of this invention is particularly adapted for use with a motorcycle 11. The motorcycle 11 illustrated is a typical trail or cross-country motorcycle. The motorcycle 11 basically includes a main frame 12 which supports motor 13, gasoline tank 14, and seat 15 in known fashion. A front fork 16 and handlebars 17 are also fixed to the main frame 12 in known fashion, front wheel 18 being rotatably carried on the front fork.

The novel rear wheel suspension system 10 is, of course, structurally interconnected with the motorcycle's rear wheel 19. The rear wheel suspension system 10 includes a one-piece, or integral, swing arm frame of generally H-shaped configuration having opposed swing arms 20, 21 and connector bar 9. The swing arms 20, 21 are disposed on opposite sides of the motorcycle's main frame in substantially mirror relation therewith, the arms being immobile relative one to the other. The rear wheel 19 is rotationally connected on rotational axis 22 through suitable bearings (not shown) to the rear ends 23 of each swing arm. The front ends 24 of each swing arm 20, 21 are pivotally connected on a common pivot axis 25 to opposed mount plates 26, 27, respectively, on each side of the motorcycle frame 12. The pivotal connection of each swing arm 20, 21 is established by bearing 28 in the mount plate 26, 27, each swing arm being held to the mount plate by nut 29 on threaded end 30 of the swing arm. Note that the pivot connection of the swing arms 20, 21 with the main frame 12, i.e., the pivot axis 25, is substantially beneath the motorcycle's seat 15 and is positioned such that the swing arms 20, 21 are substantially horizontal when the motorcycle 11 is in the rest attitude as shown in FIG. 1.

A shock absorber 31 is pivotally connected at one end 33 to each swing arm 20, 21 adjacent the rotational axis 22 of the rear wheel 19 at the rear end 23 of the swing arm, and is pivotally connected at the other end 34 to the main frame 12 just underneath the motorcycle's seat 15. The shock absorbers 31 may be of any type known to the art. Thus, the swing arms 20, 21 and shock absorbers 31 are oriented in mirror relation one with the other relative to the longitudinal center plane of the motorcycle 11. Note also that the shock absorber 31 and swing arm 20, 21 structural combination, on each side of the motorcycle and when viewed from the side as shown in FIG. 1, is in the nature of an L-shaped suspension system with the rear wheel 19 being rotatably carried at the tip of the L, and with the shock absorber and swing arm being pivotally connected to the main frame 12 at the points of the L. Although two shock absorbers 31 are described, a single shock absorber may be used if the swing arm 21, 22 framework is modified to permit locating the single shock absorber in the plane of the rear wheel 19.

The gasoline-powered motor 13 is directly connected to motor drive sprocket 36, that motor drive sprocket being keyed to motor drive shaft 37. A jack shaft 38 with first 39 and second 40 power transfer sprockets is fixed between mounting plates 26, 27 of the motorcycle's main frame 12. The power transfer sprockets 39, 40 are sized equal to the other, and equal to the motor drive sprocket 36. A motor drive chain 44 connects the motor drive sprocket 36 with the first power transfer sprocket 39, and a rear wheel drive chain 45 connects rear wheel sprocket 46 with the second power transfer sprocket 40. The power transfer sprockets 39, 40 are keyed on bearing 41 carried on shaft 42, the shaft being fixed between the frame mount plates 26, 27 of the motorcycle's main frame 12 by nuts 43. The drive chain 45 operates in a directional path indicated by phantom arrow 47, as viewed in FIGS. 1 and 2, when the motorcycle 11 is being driven forward by the rider.

Note particularly, when viewed from a line of sight perpendicular to the plane 48 of the wheel drive chain, i.e., when viewed from the side as illustrated in FIGS. 1 and 2, that the swing arms 20, 21 are fixed to the main frame 12 such that the common pivot axis 25 of the swing arms passes through the rear wheel drive chain 45. In other words, the swing arms' common pivot axis 25 is located relative to the rear wheel drive chain 45 so that the same intersects that drive chain. And particularly, note that the swing arms' common pivot axis 25 lies in, or intersects, the chain's tension run 45a (as opposed to the chain's slack run 45b) when the wheel drive chain 45 is viewed from a line of sight normal to the plane 48 of the chain. Most preferably, it is desirable that the swing arms' common pivot axis 25 lies closely adjacent to, or be coincident with, the tangent point of the chain's tension run 45a with the power transfer sprocket 40 when the chain 45 is viewed from a line of sight normal to the chain's plane 48, see FIG. 2. It has been found that this structural relationship of the swing arms' pivot axis 25 with the wheel drive chain 45 tends to reduce substantially (relative to the prior art suspension systems) the moment of force M (relative to pivot axis 25) imparted to the motorcycle's rear wheel 19, and generated upon heavy surges of power being transmitted to the drive chain 45 as a result of rapid forward acceleration of the motorcycle's motor 13 by the rider. This substantial reduction in the force moment M tends to reduce the tendency of the rear wheel 19 to lift or jump off the ground 49, i.e., off its traction surface, upon rapid forward acceleration of the motor 13. In other words, the rear wheel 19 tends not to lift off ground 49 in the direction shown by phantom arrow 50 in FIG. 2, i.e., swing arms 20, 21 tend not to pivot about common pivot axis 25, and the shock absorbers 31 tend not to be compressed in the direction shown by phantom arrow 51 in FIG. 2, upon heavy surges of power being transmitted to the rear wheel 19 when quite rapid acceleration of the motorcycle 11 is desired by the rider. This substantial reduction in force moment M, of course, improves traction upon start-up of the motorcycle 11, particularly when the motorcycle is being run across less than totally firm terrain such as might be found in a bumpy or irregular geographic location.

Although the novel rear wheel suspension system 10 for a motorcycle 11 of this invention has been illustrated with a motor drive chain 44 interconnecting a motor drive sprocket 36 with first 39 and second 40 power transfer sprockets, it will be understood to those skilled in the art that a single motor drive sprocket may be substituted for the two power transfer sprockets illustrated in the Figures. In other words, the rear wheel drive chain 45 may be driven directly from the motor drive sprocket 36 simply by locating that motor drive sprocket in the position of the power transfer sprockets 39, 40 shown in FIGS. 1 and 2. This, of course, would eliminate the necessity of the motor drive chain 44 in the structural combination. The important feature of the rear wheel suspension system 10, as previously mentioned, is that the swing arms' common pivot axis 25 be located so as to pass through or intersect the tension run 45a of the rear wheel drive chain 45, and, most preferably, be coincident with the tangent point of the drive chain's tension run with the drive chain's drive sprocket 40, when the drive chain is viewed from a line of sight normal to the chain plane 48.

A typical prior art rear wheel suspension system 60 for a motorcycle is illustrated in FIG. 4. As shown therein, opposing swing arms 61 are pivotally mounted to the motorcycle's main frame 62 on a common pivot axis 63 at one end, and rear wheel 64 is rotatably carried between the other ends of the swing arms, the swing arms being substantially horizontally disposed when the motorcycle is not in use. Shock absorbers 65 connected the rear end of each swing arm 61 with the motorcycle's frame at a point underneath the seat (not shown) of the motorcycle. The motor drive sprocket 66, which is connected to the motor (not shown), of course, is located substantially forward of the swing arms' common pivot axis 63. The rear wheel's drive chain 67 connects the rear wheel's drive sprocket 68 and the motor drive sprocket 66. Note that the swing arms' common pivot axis 63 is disposed between the tension run 67a and the slack run 67b of the drive chain 66. It is the offset distance D between the rear wheel drive chain's tension run 67a and the swing arms' common pivot axis 63 that generates the moment of force M' which causes the disadvantages associated with this prior art type rear wheel suspension system 60. In other words, it is this force moment (shown by phantom arrow M') about swing arm axis 63 which causes the rear wheel 64 to lift off or jump off its traction surface upon high acceleration power surges being provided to the rear wheel's drive chain 67 from the motorcycle's motor (not shown). The distance D, and hence the resulting moment M', in the prior art suspension, increases as the rear wheel 64 lifts off the ground, tending to aggravate the traction problem during periods of high acceleration.

Having described in detail the preferred embodiment of my invention, what I desire to claim and protect by Letters Patent is:

1. A rear wheel suspension system for a motorcycle, said suspension system comprising
    at least one swing arm rotatably mounting said motorcycle's rear wheel at one end, said swing arm being pivotally connected to said motorcycle's main frame at the other end,
    a power transfer sprocket mounted to said motorcycle's main frame and a rear wheel drive sprocket mounted to said rear wheel, and
    a rear wheel drive chain drivingly connecting said two sprockets, the pivot axis of said swing arm being located in the tension run of said rear wheel chain when said drive chain is viewed from a line of sight normal to the plane of said rear wheel drive chain.

2. A rear wheel suspension system as set forth in claim 1 including
    at least one shock absorber connected to said swing arm adjacent the rear wheel end thereof and connected to said motorcycle's main frame at the other end.

3. A rear wheel suspension system as set forth in claim 2 wherein said swing arms' pivot axis is closely adjacent to or coincident with the tangent point of said drive chain's tension run with said power transfer sprocket.

4. A rear wheel suspension system as set forth in claim 2 including
    a motor drive sprocket mounted to said main frame, said motor drive sprocket being directly connected to said motorcycle's motor, and
    a motor drive chain connecting said motor drive sprocket with said power transfer sprocket.

5. A rear wheel suspension system as set forth in claim 2 including
    two swing arms, said swing arms being positioned on opposite sides of said rear wheel and being immobile relative one to the other.

* * * * *